US008024715B2

(12) United States Patent
Reis et al.

(10) Patent No.: US 8,024,715 B2
(45) Date of Patent: Sep. 20, 2011

(54) METHOD AND APPARATUS FOR DETECTING TRANSIENT FAULTS VIA DYNAMIC BINARY TRANSLATION

(75) Inventors: George A. Reis, Robbinsville, NJ (US); Robert Cohn, Salem, NH (US); Shubhendu S. Mukherjee, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 1397 days.

(21) Appl. No.: 11/478,470

(22) Filed: Jun. 29, 2006

(65) Prior Publication Data

US 2008/0005725 A1 Jan. 3, 2008

(51) Int. Cl.
*G06F 9/45* (2006.01)

(52) U.S. Cl. ........................................................ 717/146
(58) Field of Classification Search ................... 717/146
See application file for complete search history.

(56) References Cited

U.S. PATENT DOCUMENTS

| 2004/0133445 A1* | 7/2004 | Rajan et al. ........................ 705/1 |
| 2005/0027559 A1* | 2/2005 | Rajan et al. ........................ 705/1 |

* cited by examiner

*Primary Examiner* — John Chavis
(74) *Attorney, Agent, or Firm* — L. Cho (57) ABSTRACT

A method for detecting transient fault includes translating binary code to an intermediate language code. An instruction of interest in the intermediate language code is identified. Reliability instructions are inserted in the intermediate language code to validate values from the instruction of interest. The intermediate language code is translated to binary code. Other embodiments are described and claimed.

21 Claims, 9 Drawing Sheets

METHOD AND APPARATUS FOR DETECTING TRANSIENT FAULTS VIA DYNAMIC BINARY TRANSLATION

FIELD

An embodiment of the present invention relates to transient fault detection. More specifically, an embodiment of the present invention relates to a method and apparatus for transforming code to detect transient faults via dynamic binary translation.

BACKGROUND

In recent decades, microprocessor performance has been increasing exponentially due in large part to smaller and faster transistors enabled by improved fabrication technology. While such transistors yield performance enhancements, they are more susceptible to transient faults. Transient faults are caused by external particle strikes or process-related parametric variation. Transient faults do not cause permanent damage to a microprocessor, but may manifest as soft errors by altering signal transfers and stored values, resulting in incorrect program execution.

Software-only approaches to fault detection and recovery have shown to significantly improve reliability. These approaches are attractive to designers since they require no hardware modifications, making them significantly cheaper and easier to deploy. These techniques can also be used for systems that have already been manufactured and require higher reliability than the hardware alone can offer. This need can occur because of poor estimate of the severity of the soft error problem and uncertainty in the usage condition. Changes to the operating environment of the hardware can also have a noticeable effect on reliability.

Prior approaches to software-only error mitigation have relied primarily on static compilation techniques that require alterations to the compilation process and access to the application's source code. In order to use these techniques, a user would be required to collaborate with the software vendor to acquire the application source code, rendering these techniques impractical for many applications.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
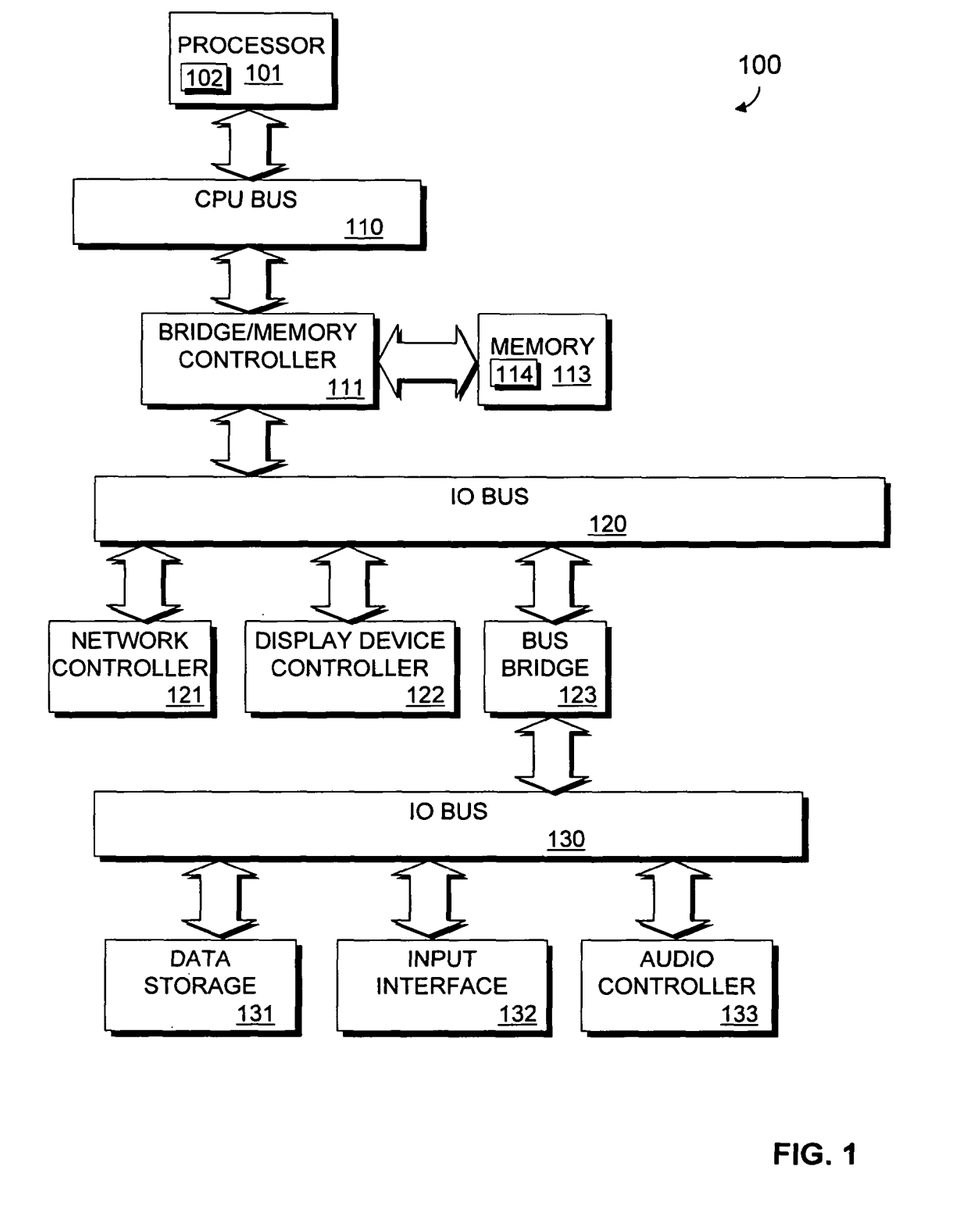
FIG. 1 illustrates an exemplary computer system implementing an embodiment of the present invention.

FIG. 1 is a block diagram of an exemplary computer system 100 implementing an embodiment of the present invention. The computer system 100 includes a processor 101 that processes data signals. The processor 101 may be a complex instruction set computer microprocessor, a reduced instruction set computing microprocessor, a very long instruction word microprocessor, a processor implementing a combination of instruction sets, or other processor device. FIG. 1 shows the computer system 100 with a single processor. However, it is understood that the computer system 100 may operate with multiple processors. Additionally, each of the one or more processors may support one or more hardware threads. The processor 101 is coupled to a CPU bus 110 that transmits data signals between processor 101 and other components in the computer system 100.

The computer system 100 includes a memory 113. The memory 113 may be a dynamic random access memory device, a static random access memory device, read-only memory, and/or other memory device. The memory 113 may store instructions and code represented by data signals that may be executed by the processor 101. A cache memory 102 may reside inside processor 101 that stores data signals stored in memory 113. The cache 102 speeds access to memory by the processor 101 by taking advantage of its locality of access. In an alternate embodiment of the computer system 100, the cache 102 resides external to the processor 101. A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first IO bus 120.

The first IO bus 120 may be a single bus or a combination of multiple buses. The first IO bus 120 provides communication links between components in the computer system 100. A network controller 121 is coupled to the first IO bus 120. The network controller 121 may link the computer system 100 to a network of computers (not shown) and supports communication among the machines. A display device controller 122 is coupled to the first IO bus 120. The display device controller 122 allows coupling of a display device (not shown) to the computer system 100 and acts as an interface between the display device and the computer system 100.

A second IO bus 130 may be a single bus or a combination of multiple buses. The second IO bus 130 provides communication links between components in the computer system 100. A data storage 131 is coupled to the second IO bus 130. The data storage 131 may be a hard disk drive, a floppy disk drive, a CD-ROM device, a flash memory device or other mass storage device. An input interface 132 is coupled to the second IO bus 130. The input interface 132 may be, for example, a keyboard and/or mouse controller or other input interface. The input interface 132 may be a dedicated device or can reside in another device such as a bus controller or other controller. The input interface 132 allows coupling of an input device to the computer system 100 and transmits data signals from an input device to the computer system 100. An audio controller 133 is coupled to the second IO bus 130. The audio controller 133 operates to coordinate the recording and playing of sounds and is also coupled to the IO bus 130. A bus bridge 123 couples the first IO bus 120 to the second IO bus 130. The bus bridge 123 operates to buffer and bridge data signals between the first IO bus 120 and the second IO bus 130.

According to an embodiment of the present invention, a transient fault detector (TFD) unit 114 may be stored in memory 113 and executed by the processor 101. The transient fault detector unit 114 dynamically increases the reliability of applications on the processor 101. The transient fault detector unit 114 generates reliability instructions by duplicating some of the instructions in the application using independent register values and generating new instructions that operate to validate data before it is stored in memory to ensure that data written to memory is fault free. When data is unable to be validated, a notification may be generated and/or the application may be stopped.

Figure 2:
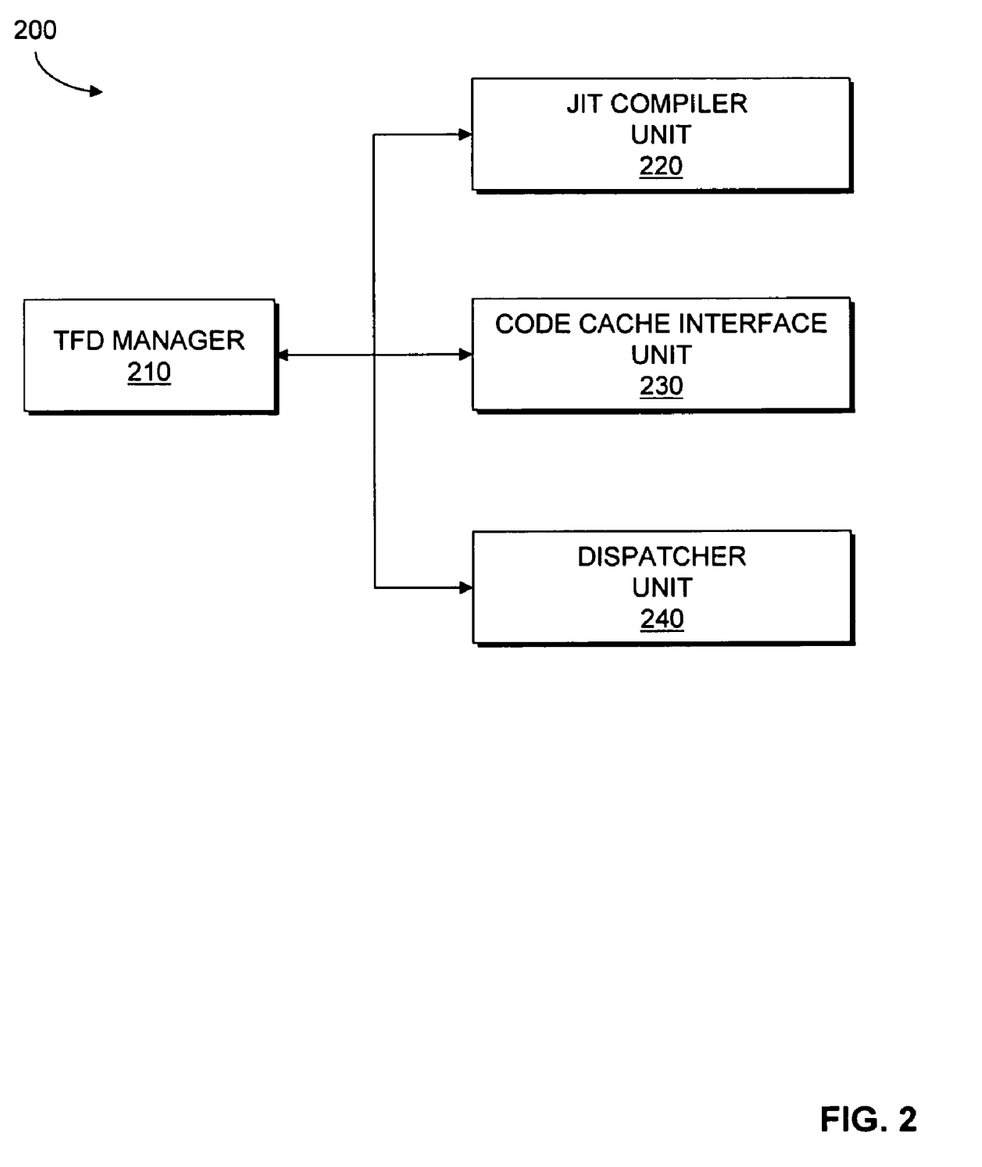
FIG. 2 is a block diagram of a transient fault detector unit according to an exemplary embodiment of the present invention.

FIG. 2 is a block diagram of a transient fault detector unit 200 according to an exemplary embodiment of the present invention. The transient fault detector unit 200 may be used to implement the transient fault detector unit 114 shown in FIG. 1. According to an embodiment of the present invention, aspects of the transient fault detector 200 may be implemented using a dynamic binary instrumentation tool. The transient fault detector unit 200 includes a transient fault detector (TFD) manager 210. The transient fault detector manager 210 is coupled to and transmit information between the components in the transient fault detector unit 200.

The transient fault detector unit 200 includes a just-in-time (JIT) compiler unit 220. The just-in-time compiler unit 220 is provided with binary code that is to be executed from an application. According to an embodiment of the present invention, the binary code may be code that is formatted as 0s and 1s that is readable to a processor. The just-in-time compiler unit 220 translates the binary code to an intermediate language code. The just-in-time compiler unit 220 identifies instructions of interest in the intermediate language code and inserts reliability instructions in the intermediate language code to validate values from the instructions of interest. The instructions of interest and the locations where the reliability instructions are inserted may be specified by a user to allow the user to set a level of protection to implement for an application. After the reliability instructions are inserted into the intermediate language code, the intermediate language code is translated back into binary code for execution. The translating of the binary code, identifying instructions of interest, and inserting of reliability code is performed dynamically when the binary code is prompted for execution. The just-in-time compiler unit 220 transforms the original code to reliable code.

The transient fault detector unit 200 includes a code cache interface 230. The code cache interface 230 stores the reliable code into a code cache. The reliable code generated for an application may be stored in the code cache during the duration of the application's execution. According to an embodiment of the invention, the transient fault detector unit 200 may be run on a virtual machine (VM) and the code cache may reside on a physical machine and managed by a virtual machine manager.

The transient fault detector unit 200 includes a dispatcher unit 240. The dispatcher unit 240 identifies a line of code in the code cache to be executed and directs the line of code to be executed.

It should be appreciated that the transient fault detector 200 may include other optional components. For example, the transient fault detector 200 may include an emulator unit to interpret instructions that may not be executed directly. The emulator unit may be used for system calls which require special handling from a VM.

Figure 3:
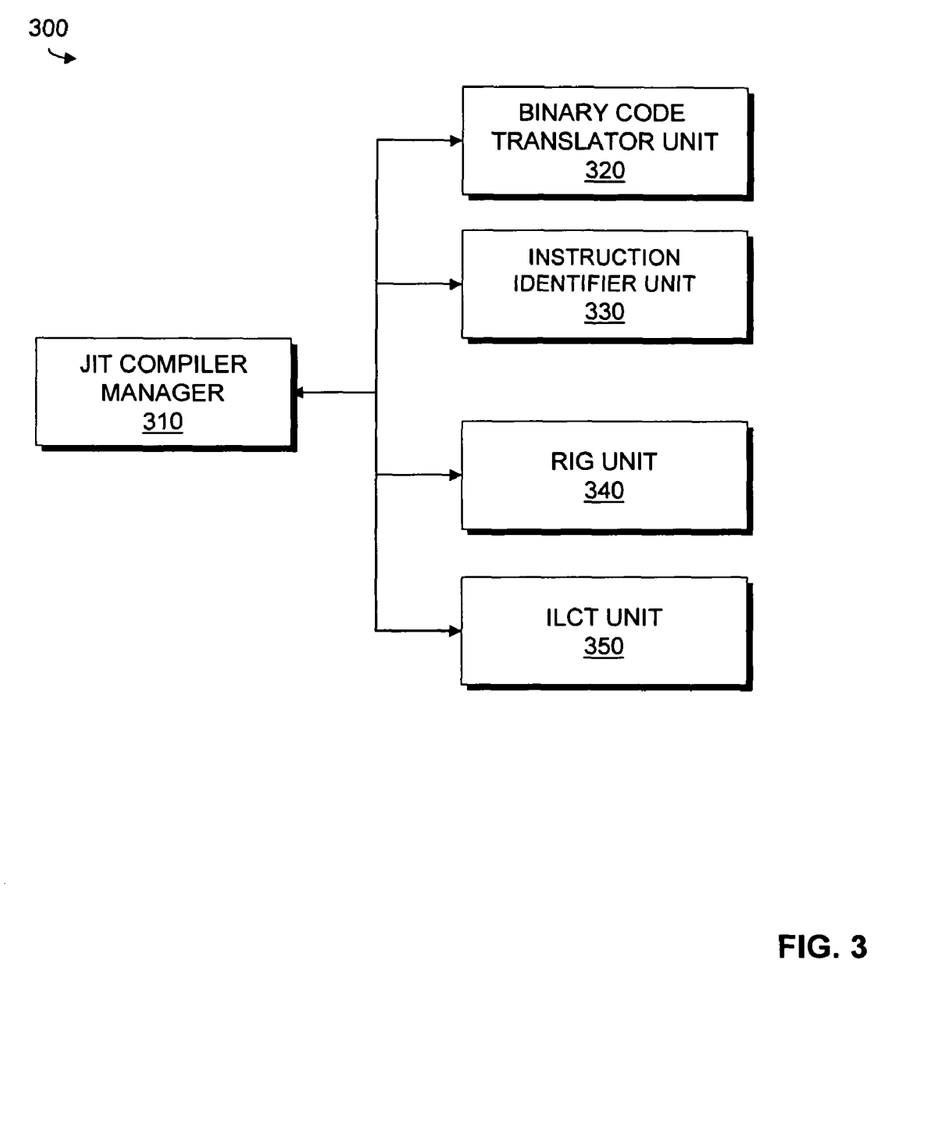
FIG. 3 is a block diagram of a just-in-time compiler unit according to an exemplary embodiment of the present invention.

FIG. 3 is a block diagram of a just-in-time compiler unit 300 according to an exemplary embodiment of the present invention. The just-in-time compiler unit 300 may be implemented as the just-in-time compiler unit 220 shown in FIG. 2. The just-in-time compiler unit 300 includes a just-in-time compiler manager 310. The just-in-time compiler manager 310 is coupled to and transmits information between the components in the just-in-time compiler unit 300.

The just-in-time compiler unit 300 includes a binary code translator unit 320. The binary code translator unit 320 receives binary code from an application that is to be executed. The binary code translator unit 320 translates the binary code to an intermediate language code.

The just-in-time compiler unit 300 includes an instruction identifier unit 330. The instruction identifier unit 330 identifies instructions of interest in the intermediate language code. According to an embodiment of the just-in-time compiler unit 300, the instruction identifier unit 330 identifies memory load, memory store, control flow, timestamp counter read, and/or other instructions of interest.

The just-in-time compiler unit 300 includes a reliability instruction generation (RIG) unit 340. The reliability instruction generation unit 340 generates reliability instructions (code) to validate values in the instructions of interest identified by the instruction identifier unit 330. According to an embodiment of the present invention, for a memory load instruction, the reliability instructions generated may include instructions that validate a memory address to be read from and instructions that duplicate the value read from the memory address. For a memory store instruction, the reliability instructions generated may include instructions that validate a memory address to be written to and that validates a value to be written to the memory address. For a control flow instruction, the reliability instructions generated may include instructions that validate the values that are compared for a branch. For a timestamp read instruction, reliability instructions generated may include instructions that duplicate the timestamp counter value read. If values are unable to be validated, a notification may be generated and/or the application may be stopped. According to an embodiment of the just-in-time compiler unit 300, the reliability instruction generation unit 340 also generates duplicate non-memory access instructions using redundant version of registers. The non-memory access instructions may include, for example, arithmetic instructions. The reliability instructions generated may be inserted into the existing intermediate language code (original code) by either the reliability instruction generation unit 340 or the just-in-time compiler manager 310 to form reliable code.

The just-in-time compiler unit 300 includes an intermediate language code translator (ILCT) unit 350. The intermediate language code translator unit 350 translates the intermediate language code that includes the reliability instructions generated by the reliability instruction generation unit 340 to binary code.

According to an embodiment of the present invention, the transient fault detection unit 300 (shown in FIG. 3) allows a user to trade-off between having an application run with reliability and good performance at fine granularities. The transient fault detection unit 300 may add reliability in certain environments for specific applications and/or for critical regions of an application, thus increasing the reliability of the application while reducing the cost of performance. The user may use the transient fault detection unit 300 to protect as much or as little of an application as required by a performance and reliability budget. According to an embodiment of the present invention, this may be achieved by having the just-in-time compiler manager 310 direct the instruction identifier unit 330 to identify only specific instructions of interest as specified by a user. The just-in-time compiler manager 310 may also direct the reliability instruction generation unit 340 to generate reliability code to be inserted at only locations in the intermediate code as specified by a user. It should be appreciated that other techniques may be used to allow a user to vary the amount of protection to add to an application.

According to an embodiment of the present invention, all instructions in an application are duplicated except for those that are written to memory. Since a transient fault causing data corruption will only manifest itself as a program error if it changes the output, validation of values is delayed until there is an instruction that may affect output, such as a memory store instruction. This approach ensures that an error in a dynamically dead register or an error whose value would be masked would not be flagged. According to an embodiment of the present invention, memory load instructions are not duplicated. Instead, a copy of the loaded value is created and loaded into a redundant register. This ensures that the two versions receive the same data.

Figure 4:
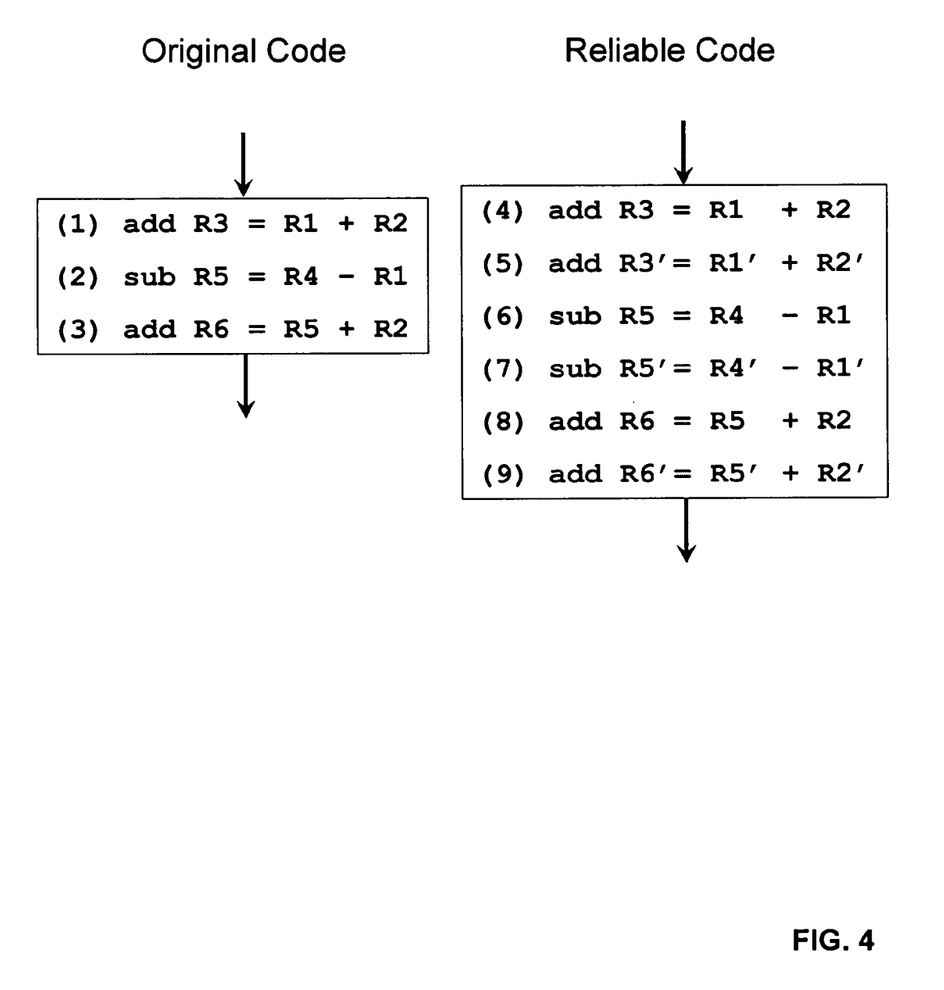
FIG. 4 illustrates code reliability transformation of non-memory access instructions according to an exemplary embodiment of the present invention.

FIG. 4 illustrates code reliability transformation of non-memory access instructions according to an exemplary embodiment of the present invention. Lines (1)-(3) in FIG. 4 illustrate non-memory access instructions in the original code of an exemplary application. Lines (5), (7), and (9) in FIG. 4 illustrate exemplary reliability instructions that are generated and inserted with the original code to form reliable code. The reliability instructions include duplicate instructions using redundant versions of registers. The values in the registers may be referenced and validated elsewhere by reliability instructions added elsewhere in the application.

Figure 5:
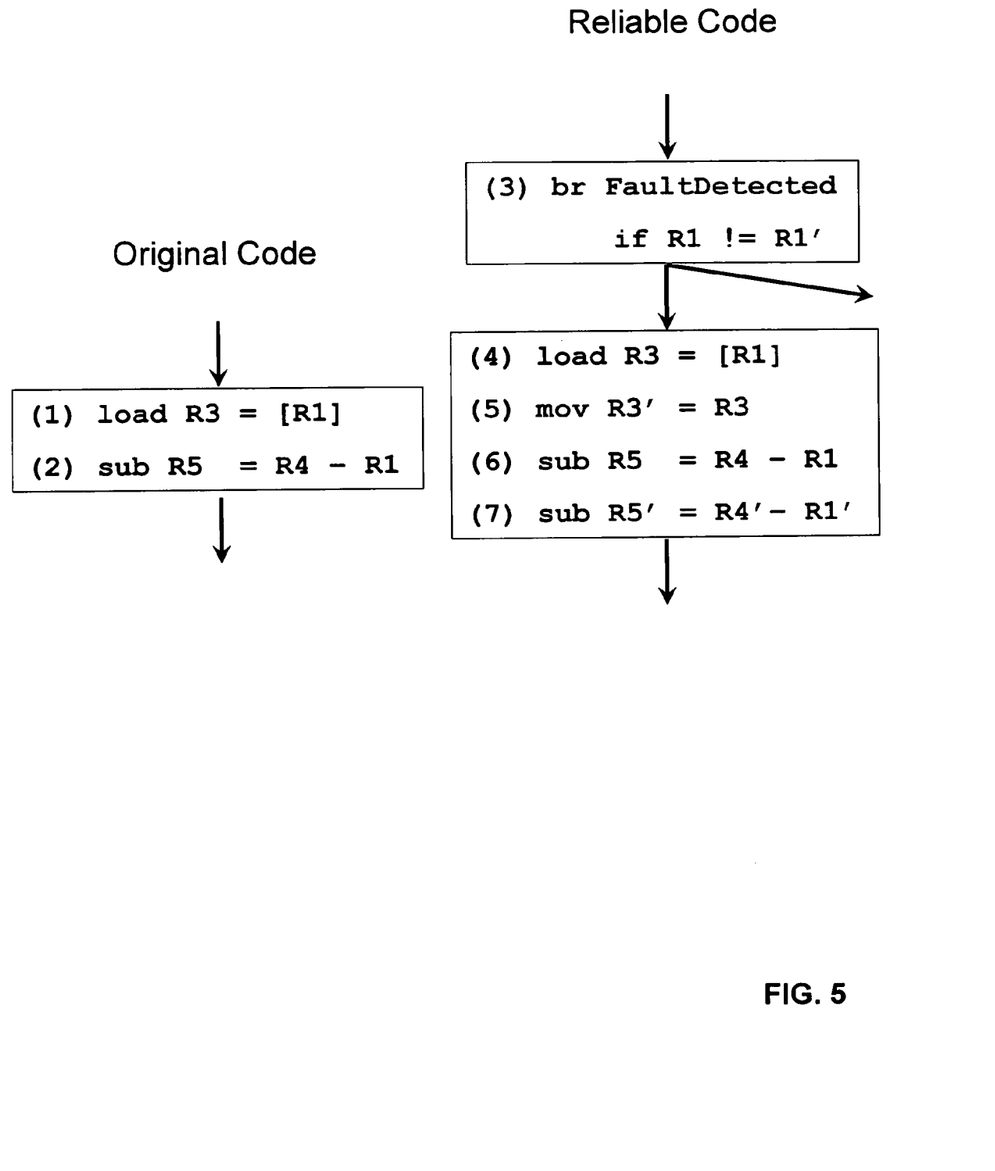
FIG. 5 illustrates code reliability transformation of a memory load instruction according to an exemplary embodiment of the present invention.

FIG. 5 illustrates code reliability transformation of a memory load instruction according to an exemplary embodiment of the present invention. Line (1) in FIG. 5 illustrates a memory load instruction in the original code of an exemplary application. Lines (3) and (5) in FIG. 5 illustrate exemplary reliability instructions that are generated and inserted with the original code to form reliable code. The reliability instructions include an instruction to compare a value from a first register used as a memory address with a value from a second register used as a redundant memory address (3), and an instruction to move a value from a third register loaded from the memory address to a fourth register (5). If the values in the comparison do not match, a notification may be generated and/or the application may be stopped. The reliability instructions validate the memory address and duplicate the loaded value.

Figure 6:
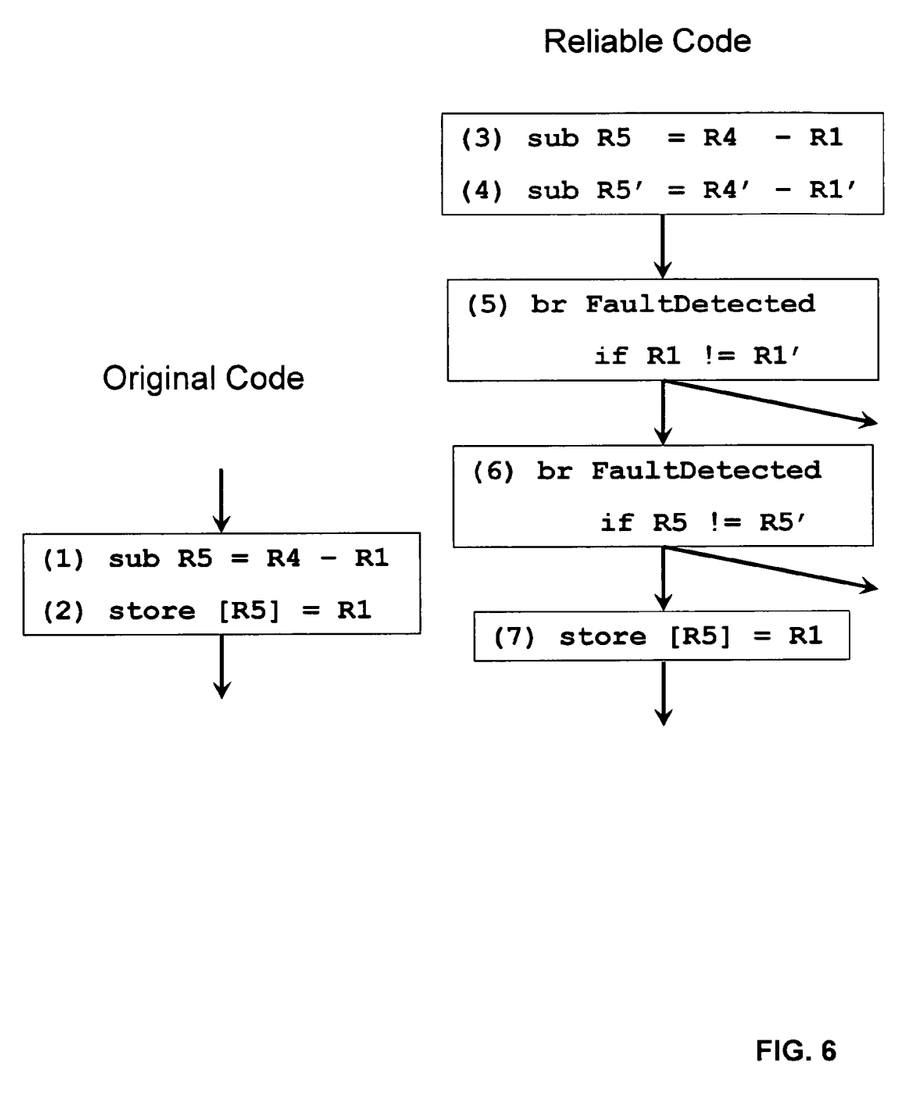
FIG. 6 illustrates code reliability transformation of a memory store instruction according to an exemplary embodiment of the present invention.

FIG. 6 illustrates code reliability transformation of a memory store instruction according to an exemplary embodiment of the present invention. Line (2) in FIG. 6 illustrates a memory store instruction in the original code of an exemplary application. Lines (5) and (6) in FIG. 6 illustrate exemplary reliability instructions that are generated and inserted with the original code to form reliable code. The reliability instructions include an instruction to compare a value from a first register used as a memory address with a value from a second register used as a redundant memory address (5), and an instruction to compare a value from third register to be stored at the memory address with a value from a fourth register to be used as a redundant value (6). If the values in the comparisons do not match, a notification may be generated and/or the application may be stopped. The reliability instructions validate the memory address and the data stored.

Figure 7:
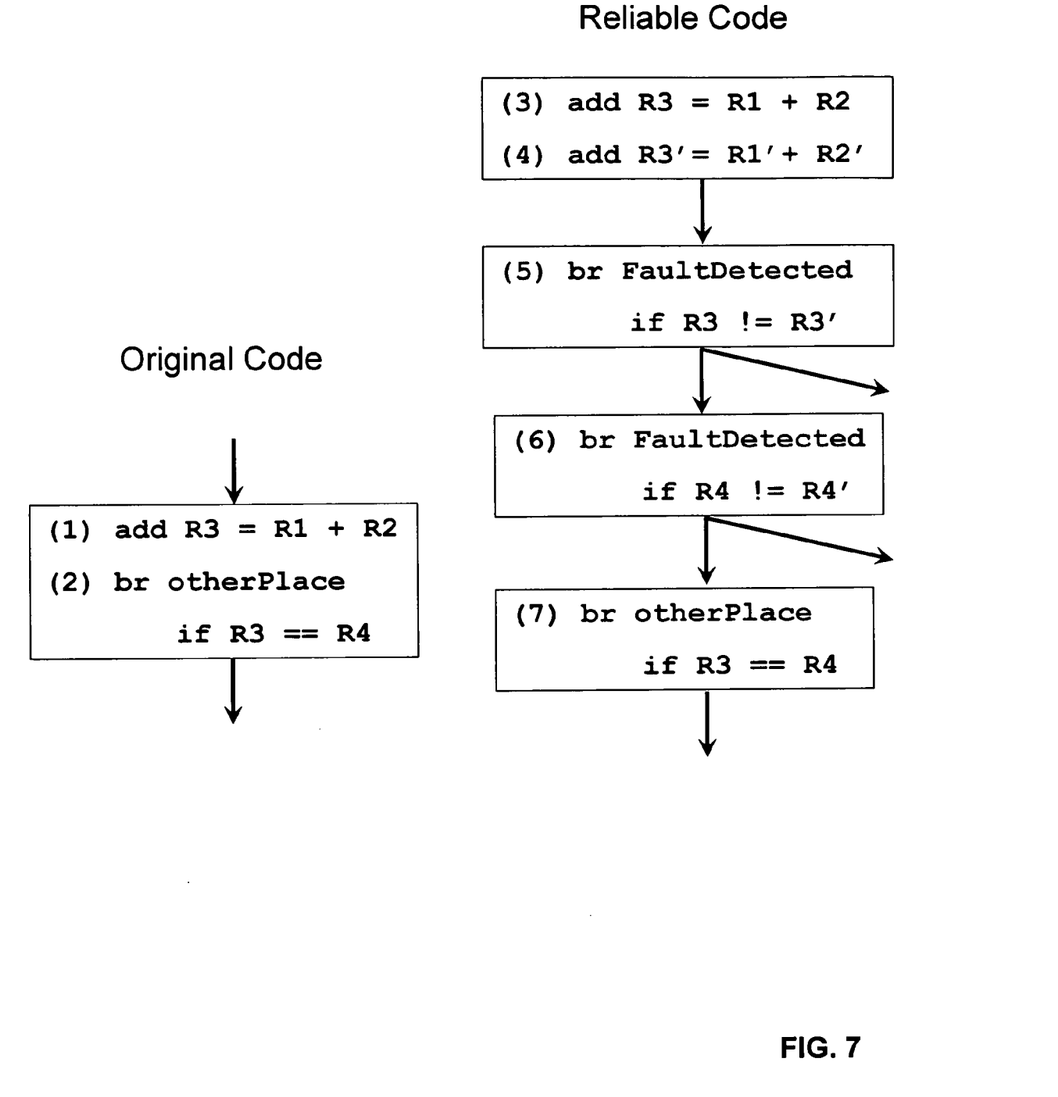
FIG. 7 illustrates code reliability transformation of a control flow instruction according to an exemplary embodiment of the present invention.

FIG. 7 illustrates code reliability transformation of a control flow instruction according to an exemplary embodiment of the present invention. Line (2) in FIG. 7 illustrates a control flow (branch) instruction in the original code of an exemplary application. Lines (5) and (6) in FIG. 7 illustrate exemplary reliability instructions that are generated and inserted with the original code to form reliable code. The reliability instructions include an instruction to compare a value from a first register used as a first comparand with a value from a second register used as a redundant first comparand, and an instruction to compare a value from a third register used as a second comparand with a value from a fourth register to be used as a redundant second comparand. If the values in the comparisons do not match, a notification may be generated and/or the application may be stopped. The reliability instructions validate all inputs to the original control flow instruction (2)/(7).

Figure 8:
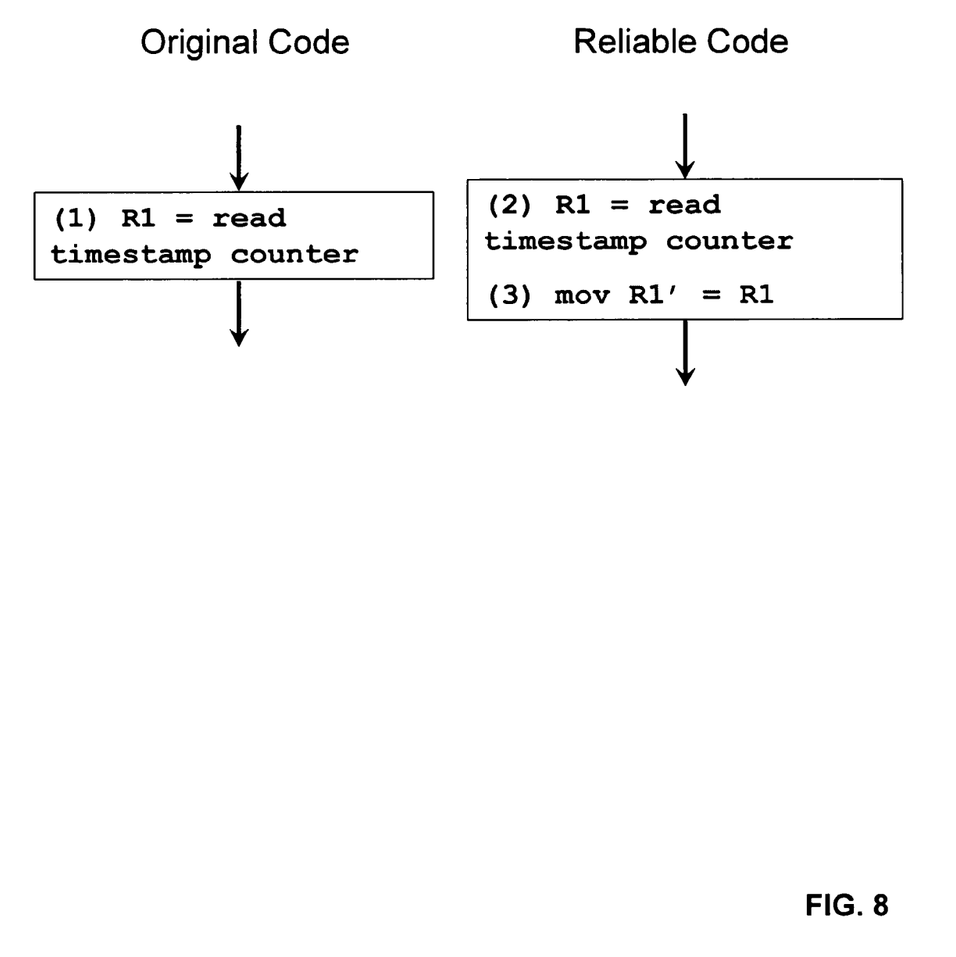
FIG. 8 illustrates code reliability transformation of a timestamp counter read instruction according to an exemplary embodiment of the present invention.

FIG. 8 illustrates code reliability transformation of a timestamp counter read instruction according to an exemplary embodiment of the present invention. Line (1) in FIG. 8 illustrates a timestamp counter read instruction in the original code of an exemplary application. Line (3) in FIG. 8 illustrates an exemplary reliability instruction that is generated and inserted with the original code to form reliable code. The reliability instruction includes an instruction to move a value from a first register that is a timestamp counter value to a second register. The reliability instruction duplicates the read value.

Figure 9:
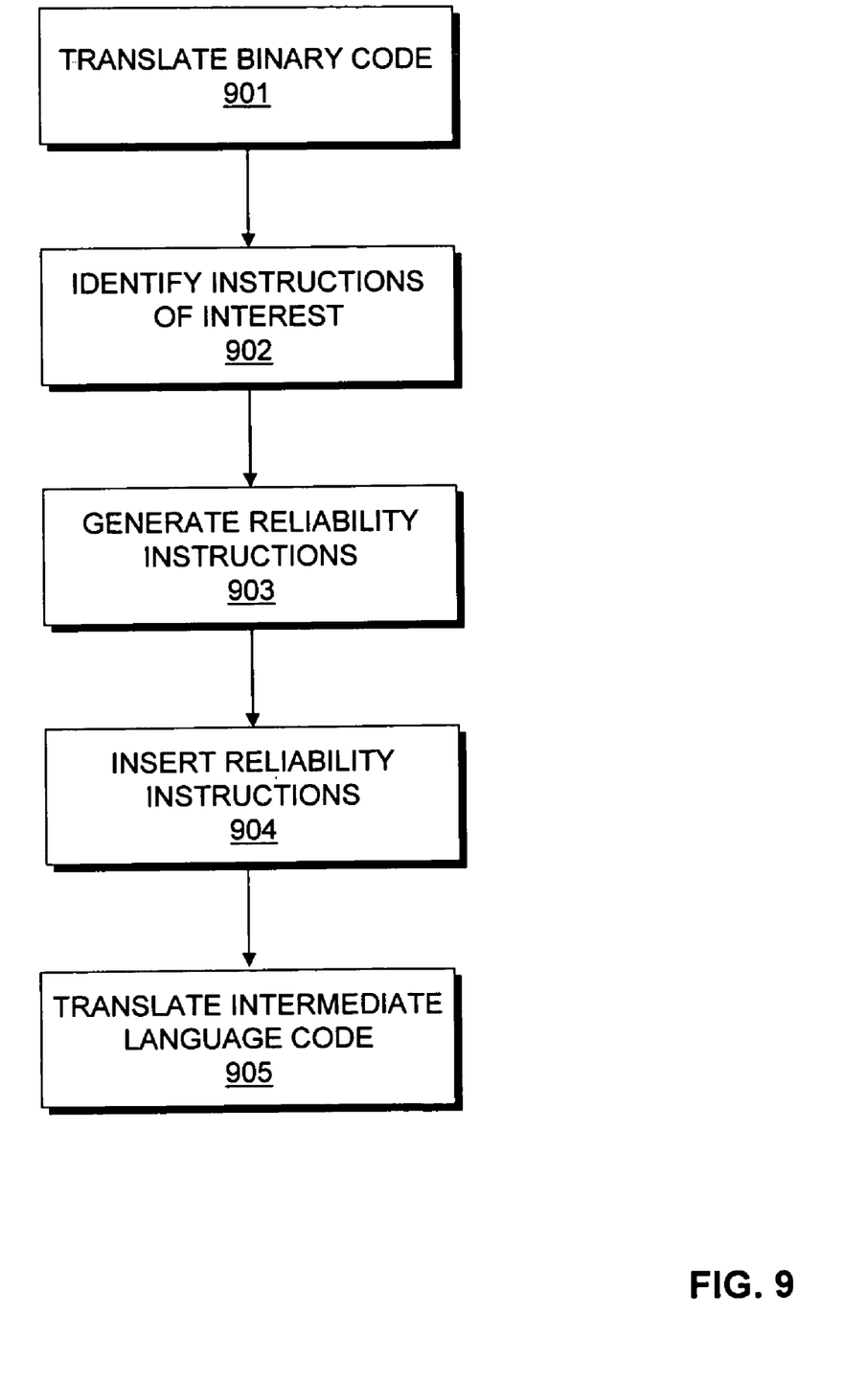
FIG. 9 is a flow chart illustrating a method for transforming code to detect transient faults according to an exemplary embodiment of the present invention.

FIG. 9 is a flow chart illustrating a method for transforming code to detect transient faults according to an exemplary embodiment of the present invention. At 901, binary code is translated to intermediate language code. According to an embodiment of the present invention, the binary code may be binary code from an application that is to be executed.

At 902, instructions of interest are identified in the intermediate language code. According to an embodiment of the present invention, the instructions of interests may be specified by a user. The instructions may include memory load, memory store, control flow, timestamp counter read, and other instructions.

At 903, reliability instructions are generated. According to an embodiment of the present invention, the reliability instructions validate values from the instruction of interest. The reliability instructions may also include instructions that duplicate non-memory access instructions from the application using redundant versions of registers.

At 904, reliability instructions are inserted in the intermediate language code. The insertion of the reliability instructions into the original code transforms the original code to reliable code. It should be appreciated that the user may specify locations in the application where reliability instructions are to and are not to be inserted.

At 905, the intermediate language code is translated to binary code. According to an embodiment of the present invention, the procedures described above are performed dynamically when the original binary code is prompted for execution. The dynamic generation of reliable code allows the reliable code to be executed in place of the original binary code.

Embodiments of the present invention provide an improved method and apparatus to detect transient faults that imposes a reduced level of performance degradation than those of prior approaches. Embodiments of the present invention also offer a user the opportunity to select a level of reliability and performance for code to be transformed. Embodiments of the present invention provide a software solution for detecting transient faults that may be directed to code executed on x86 processors as well as other processor architectures.

FIG. 9 is a flow chart illustrating a method for transforming code to detect transient faults according to an embodiment of the present invention. Some of the techniques illustrated in this figure may be performed sequentially, in parallel or in an order other than that which is described. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for transforming code to detect transient faults, comprising:
    translating binary code to an intermediate language code;
    identifying an instruction of interest in the intermediate language code;
    inserting reliability instructions in the intermediate language code to validate register values in memory accessed by the instruction of interest; and
    translating the intermediate language code to binary code.

2. The method of claim 1, wherein identifying an instruction of interest comprises identifying a memory load instruction.

3. The method of claim 1, wherein identifying an instruction of interest comprises identifying a memory store instruction.

4. The method of claim 1, wherein identifying an instruction of interest comprises identifying a control flow instruction.

5. The method of claim 1, wherein identifying an instruction of interest comprises identifying a timestamp counter read instruction.

6. The method of claim 2, wherein inserting reliability instructions comprises:
    inserting an instruction to compare a value from a first register used as a memory address with a value from a second register used as a redundant memory address; and
    inserting an instruction to move a value from a third register loaded from the memory address to a fourth register.

7. The method of claim 3, wherein inserting reliability instructions comprises:
    inserting an instruction to compare a value from a first register used as a memory address with a value from a second register value used as a redundant memory address; and
    inserting an instruction to compare a value from a third register to be stored at the memory address with a value from a fourth register to be used as a redundant value.

8. The method of claim 4, wherein inserting reliability instruction comprises:
    inserting an instruction to compare a value from a first register used as a first comparand with a value from a second register used as a redundant first comparand; and
    inserting an instruction to compare a value from a third register used as a second comparand with a value from a fourth register to be used as a redundant second comparand.

9. The method of claim 5, wherein inserting reliability instruction comprises inserting an instruction to move a value from a first register that is a timestamp counter value to a second register.

10. The method of claim 1, further comprising inserting duplicate non-memory access instructions using a redundant version of registers.

11. The method of claim 1, wherein the instructions of interest are specified by a user.

12. The method of claim 1, wherein the reliability instructions are inserted at locations specified by a user.

13. The method of claim 1, wherein the translating, identifying, and inserting is performed dynamically when the binary code is prompted for execution.

14. An article of manufacture comprising a non-transitory machine accessible medium including sequences of instructions, the sequences of instructions including instructions which when executed cause the machine to perform:
    translating binary code to an intermediate language code;
    identifying an instruction of interest in the intermediate language code;
    inserting reliability instructions in the intermediate language code to validate values; and
    translating the intermediate language code to binary code.

15. The article of manufacture of claim 14, wherein identifying an instruction of interest comprises identifying a memory load instruction.

16. The article of manufacture of claim 14, wherein identifying an instruction of interest comprises identifying a memory store instruction.

17. The article of manufacture of claim 14, wherein inserting reliability instructions comprises inserting duplicate non-memory access instructions using redundant version of registers.

18. A computer system including a processor and a memory for storing a just-in-time (JIT) compiler unit implemented on the processor, comprising:

a binary code translator unit to translate binary code to an intermediate language code;

an instruction identifier unit to identify an instruction of interest;

a reliability instruction generation unit to insert reliability instructions in the intermediate language code to validate values; and an intermediate code translator unit to translate the intermediate language code to binary code.

19. The JIT compiler unit of claim 18, further comprising a JIT compiler manager to direct the instruction identifier unit to identify instructions of interest specified by a user.

20. The JIT compiler unit of claim 18, further comprising a JIT compiler manager to direct the reliable code unit to insert reliability instructions in the intermediate language code at locations specified by a user.

21. The JIT complier unit of claim 18, wherein the values are register values.

* * * * *

UNITED STATES PATENT AND TRADEMARK OFFICE
CERTIFICATE OF CORRECTION

| | | |
|---|---|---|
| PATENT NO. | : 8,024,715 B2 | Page 1 of 1 |
| APPLICATION NO. | : 11/478470 | |
| DATED | : September 20, 2011 | |
| INVENTOR(S) | : George A. Reis et al. | |

It is certified that error appears in the above-identified patent and that said Letters Patent is hereby corrected as shown below:

In column 10, line 13, in claim 21, delete "complier" and insert -- compiler --, therefor.

Signed and Sealed this
Twentieth Day of December, 2011

David J. Kappos
*Director of the United States Patent and Trademark Office*